(12) United States Patent
Suwald (10) Patent No.: US 10,325,120 B2
(45) Date of Patent: Jun. 18, 2019

(54) ELECTRONIC DEVICE

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 349 days.

(21) Appl. No.: 15/406,700

(22) Filed: Jan. 14, 2017

(65) Prior Publication Data

US 2017/0206383 A1 Jul. 20, 2017

(30) Foreign Application Priority Data

Jan. 15, 2016 (EP) ..................... 16151489

(51) Int. Cl.
*G06K 19/073* (2006.01)
*H01L 23/00* (2006.01)
(Continued)

(52) U.S. Cl.
CPC ......... *G06F 21/77* (2013.01); *G06K 9/00577* (2013.01); *G06K 9/46* (2013.01); *G06K 19/073* (2013.01); *H01L 23/573* (2013.01); *H01L 24/29* (2013.01); *H01L 24/32* (2013.01); *H04L 9/3278* (2013.01); *H01L 24/02* (2013.01); *H01L 24/05* (2013.01); *H01L 24/83* (2013.01); *H01L 2224/0239* (2013.01); *H01L 2224/04026* (2013.01); *H01L 2224/05548* (2013.01); *H01L 2224/2929* (2013.01);
(Continued)

(58) Field of Classification Search
CPC .. G01R 27/2605; G06K 19/073; G06F 21/77; H04L 9/3278; H04L 9/3271

USPC ......................................................... 324/679
See application file for complete search history.

(56) References Cited

U.S. PATENT DOCUMENTS 5,881,155 A 3/1999 Rigal
6,588,672 B1 7/2003 Usami
(Continued)

FOREIGN PATENT DOCUMENTS

EP 2 819 049 A1 12/2014
WO WO-02/054492 A2 7/2002
(Continued)

OTHER PUBLICATIONS

Extended European Search Report for Patent Appln. No. 16151489.8 (dated Jul. 8, 2016).

*Primary Examiner* — Amy He (57) ABSTRACT

According to a first aspect of the present disclosure, an electronic device is provided which comprises: a substrate; an integrated circuit; a layer of glue between the substrate and the integrated circuit; a set of driving electrodes coupled to the glue and to the integrated circuit; a receiving electrode coupled to the glue and to the integrated circuit; a counter electrode coupled to the glue and to the substrate; wherein the glue comprises conductive particles which electrically connect the receiving electrode, the counter electrode and at least a part of the set of driving electrodes, such that, if drive currents are provided to said set of driving electrodes, at least a part of the drive currents flows to the receiving electrode through the conductive particles and the counter electrode. According to a second aspect of the present disclosure, a corresponding method of manufacturing an electronic device is conceived.

14 Claims, 8 Drawing Sheets

FIG. 5

(51) Int. Cl.
*G06F 21/77* (2013.01)
*H04L 9/32* (2006.01)
*G06K 9/46* (2006.01)
*G06K 9/00* (2006.01)

(52) U.S. Cl.
CPC ............ *H01L 2224/29339* (2013.01); *H01L 2224/29344* (2013.01); *H01L 2224/29499* (2013.01); *H01L 2224/32106* (2013.01); *H01L 2224/32227* (2013.01); *H01L 2224/83851* (2013.01); *H01L 2224/83862* (2013.01); *H01L 2224/83874* (2013.01)

(56) References Cited

U.S. PATENT DOCUMENTS

| | | |
|---|---|---|
| 8,516,269 B1 | 8/2013 | Hamlet et al. |
| 2008/0108181 A1* | 5/2008 | Chan ............... G06K 19/07749 438/119 |
| 2010/0127822 A1 | 5/2010 | Devadas |
| 2011/0254141 A1 | 10/2011 | Roest et al. |
| 2012/0002803 A1 | 1/2012 | Adi et al. |
| 2016/0003895 A1* | 1/2016 | Farr .................. G01R 31/2884 324/754.03 |

FOREIGN PATENT DOCUMENTS

| | | |
|---|---|---|
| WO | WO-2008/093273 A2 | 8/2008 |
| WO | WO-2011/141422 A1 | 11/2011 |

* cited by examiner

ELECTRONIC DEVICE

CROSS-REFERENCE TO RELATED APPLICATIONS

This application claims the priority under 35 U.S.C. § 119 of European patent application no. 16151489.8, filed on Jan. 15, 2016, the contents of which are incorporated by reference herein.

FIELD

The present disclosure relates to an electronic device. Furthermore, the present disclosure relates to a corresponding method of manufacturing an electronic device.

BACKGROUND

Today, electronic devices such as smart cards are widely used in society. For example, smart cards may be used as electronic identity (eID) cards. The end-user acceptance of such eID cards, however, is still relatively low. Although the eID cards are relatively secure, due to their cryptographic capabilities which are offered by embedded secure elements (e.g., secure controller chips), it is difficult to verify whether a particular combination of a secure element and a device body (e.g., a substrate) on which said secure element is mounted is authentic. In general, it is difficult to verify whether a particular combination of integrated circuit (e.g., a processing unit) and a device body (e.g., a substrate) on which said integrated circuit is mounted is authentic. Consequently, electronic devices of the kind set forth are still susceptible to tampering.

SUMMARY

According to a first aspect of the present disclosure, an electronic device is provided which comprises: a substrate; an integrated circuit; a layer of glue between the substrate and the integrated circuit; a set of driving electrodes coupled to the glue and to the integrated circuit; a receiving electrode coupled to the glue and to the integrated circuit; a counter electrode coupled to the glue and to the substrate; wherein the glue comprises conductive particles which electrically connect the receiving electrode, the counter electrode and at least a part of the set of driving electrodes, such that, if drive currents are provided to said set of driving electrodes, at least a part of the drive currents flows to the receiving electrode through the conductive particles and the counter electrode.

In one or more embodiments, said part of the drive currents that flows to the receiving electrode depends on the distribution of the conductive particles in the glue.

In one or more embodiments, the distribution of conductive particles implements a physical unclonable function.

In one or more embodiments, the device further comprises: a current generator arranged to generate said drive currents; a measurement unit arranged to measure the part of the drive currents received by the receiving electrode and to output a corresponding current output value; a processing unit arranged to receive at least one current output value from the measurement unit, and to compare said current output value with a reference value.

In one or more embodiments, the processing unit is further arranged to correct the current output value for environmental influences.

In one or more embodiments, the integrated circuit comprises at least one of: the processing unit, the set of driving electrodes, the receiving electrode, the current generator, the measurement unit.

In one or more embodiments, the drive currents are weighted drive currents corresponding to a challenge code.

In one or more embodiments, the challenge code is generated by a processing unit comprised in said device.

In one or more embodiments, the processing unit is further arranged to compare a sequence of current output values with a predetermined response code.

In one or more embodiments, the integrated circuit is a general-purpose processor chip or an application processor chip.

In one or more embodiments, the substrate is a printed circuit board or a card inlay.

In one or more embodiments, the integrated circuit is a secure element, in particular a secure controller chip.

In one or more embodiments, the device is a smart card.

According to a second aspect of the present disclosure, a method of manufacturing an electronic device is conceived, the method comprising providing the electronic device with: a substrate; an integrated circuit; a layer of glue between the substrate and the integrated circuit; a set of driving electrodes coupled to the glue and to the integrated circuit; a receiving electrode coupled to the glue and to the integrated circuit; a counter electrode coupled to the glue and to the substrate; wherein the glue comprises conductive particles which electrically connect the receiving electrode, the counter electrode and at least a part of the set of driving electrodes, such that, if drive currents are provided to said set of driving electrodes, at least a part of the drive currents flows to the receiving electrode through the conductive particles and the counter electrode.

DESCRIPTION OF DRAWINGS

Embodiments will be described in more detail with reference to the appended drawings, in which.

DESCRIPTION OF EMBODIMENTS

As mentioned above, according to a first aspect of the present disclosure, an electronic device is provided which comprises: a substrate; an integrated circuit; a layer of glue between the substrate and the integrated circuit; a plurality of driving electrodes coupled to the glue and to the integrated circuit; a receiving electrode coupled to the glue and to the integrated circuit; a counter electrode coupled to the glue and to the substrate; wherein the glue comprises conductive particles which electrically connect the receiving electrode, the counter electrode and at least apart of the driving electrodes, such that, if drive currents are provided to said driving electrodes, at least a part of the drive currents flows to the receiving electrode through the conductive particles and the counter electrode.

Integrated circuits (ICs), such as security controller chips, are often assembled into card bodies of high-security electronic documents. The authenticity of the card body and the authenticity of the security controller chip may be verified separately, but it is difficult to verify that an authentic security controller chip has been assembled in an authentic way into an authentic card body. In other words, it is difficult to verify that a particular combination (i.e., a particular assembly) of an integrated circuit and a card body (i.e., a substrate on which the integrated circuit is mounted) is authentic. According to the present disclosure, the authenticity of the assembly may be verified with relatively few resources and at relatively low cost. This is achieved by utilizing physical properties of the conductive glue which is used to attach the integrated circuit to the substrate. In particular, it may be expected that the proportion of the drive currents that flows to the receiving electrode will differ between different assemblies, because the physical properties of the conductive glue will be different for each assembly. More specifically, some of the driving electrodes will be electrically connected to the counter electrode because conductive paths are formed by conductive particles present at the driving electrodes' locations. However, at other locations conductive paths may be absent, and consequently driving electrodes at these locations are not electrically connected to the counter electrode. Thus, as the case may be, only a part (i.e., a proportion) of the drive currents may flow to the counter electrode. By measuring this proportion of the drive currents, it may be possible to uniquely identify a particular assembly.

In one or more embodiments, the part of the drive currents that flows to the counter electrode depends on the distribution of conductive particles in the glue. Since the distribution of the conductive particles may vary significantly among different assemblies, the probability that the assembly identification is unique may thus be increased. Furthermore, the distribution of conductive particles may depend on inherent variabilities in the manufacturing process, which may enable a quasi-random distribution of conductive particles. Thus, the distribution of conductive particles may implement a physical unclonable function (PUF), which may further increase the probability that the assembly identification is unique. In other words, by utilizing a quasi-random distribution of conductive particles in the conductive glue, a unique signature may be derived that may be used for IC-substrate assembly identification (i.e., for verifying that the IC-substrate assembly is authentic).

The conductive glue may be anisotropic conductive glue. Anisotropic conductive glue is a material used to assemble naked dice onto substrates such as card inlays or printed circuit boards (PCBs). The integrated circuit may be a secure element, such as a secure controller chip, in a smart card. In that case, the substrate may be the card inlay on which the secure controller chip is assembled. Alternatively, but without limitation, the integrated circuit may be a general-purpose processor chip or application processor chip. In that case, the substrate may be the PCB on which the processor chip is assembled, for example in a mobile device, and the IC-substrate assembly identification may be used to implement counterfeiting protection.

In one or more embodiments, the device further comprises a current generator arranged to generate said drive currents, a measurement unit arranged to measure the part of the drive currents received by the receiving electrode and to output a corresponding current output value, and a processing unit arranged to receive at least one current output value from the measurement unit, and to compare said current output value with a reference value. In this way, the processing of the received part or proportion of the drive currents (also referred to as the received "sum of currents" hereinafter) may be facilitated.

Figure 1:
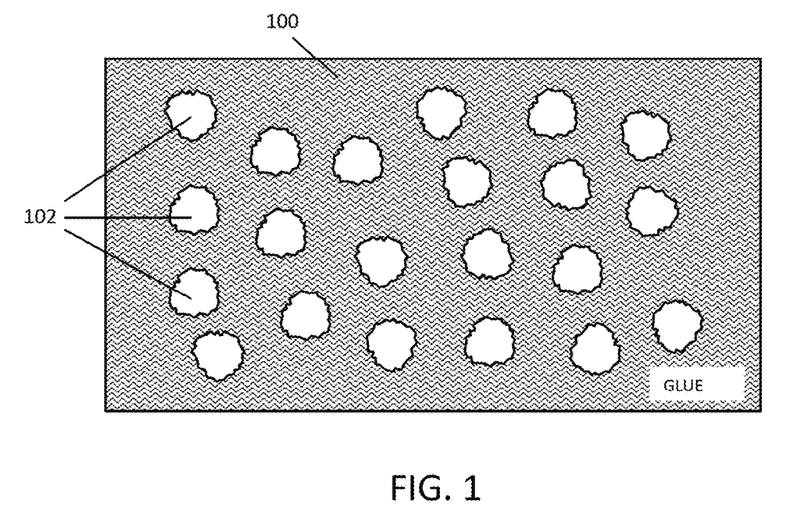
FIG. 1 shows an example of conductive glue.

FIG. 1 shows an example of conductive glue 100. The conductive glue 100 comprises conductive particles 102 dispersed in a resin. The glue 100 may be used to assemble naked dice onto substrates, such as printed circuit boards or card inlays. The conductive particles 102 may be flakes made from metals comprising, but not limited to, silver or gold. The flakes may have an irregular size and shape and may be quasi-randomly distributed in the conductive glue 100 due to inherent variabilities in the manufacturing process. Other physical effects, such as surface tension, may also influence the particle distribution. The median diameter of said flakes may be related to the diameter of contact pads to which the glue 100 is attached; as a rule of thumb the flake diameter may be selected to be at least ⅕ of the smaller of width or length of the contact pads. In practical implementations the diameters range from 10 μm to 30 μm. By applying pressure in a vertical direction during chip assembly the particles 102 contained in the glue 100 are condensed until electrical contact is established between the contact pads. The resin is displaced to the sides. Heat or UV-light applied during assembly starts the curing process of the resin. When cured the glue 100 provides strong adhesion between the chip and the substrate.

Figure 2:
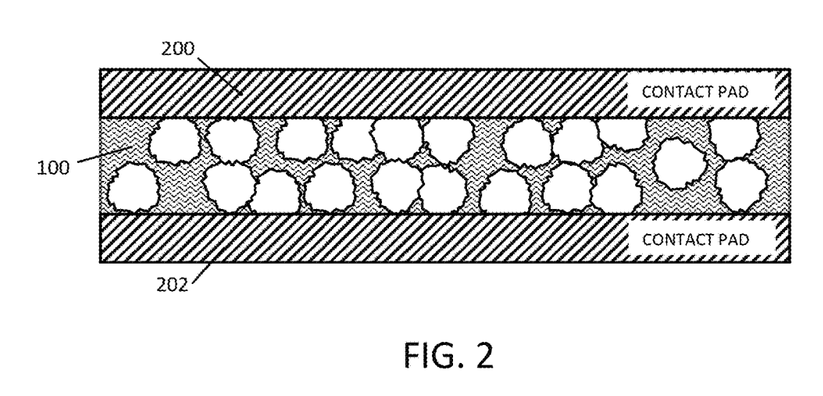
FIG. 2 shows an example of an assembly comprising conductive glue.

FIG. 2 shows an example of an assembly comprising conductive glue 100. The assembly comprises a first contact pad 200, for example of a chip (not shown), and a second contact pad 202, for example of a substrate (not shown). As can be seen, at some locations in the glue 100 there are series of conductive particles touching each other and the contact pads 200, 202, so as to create a conductive path between said contact pads 200, 202.

Figure 3:
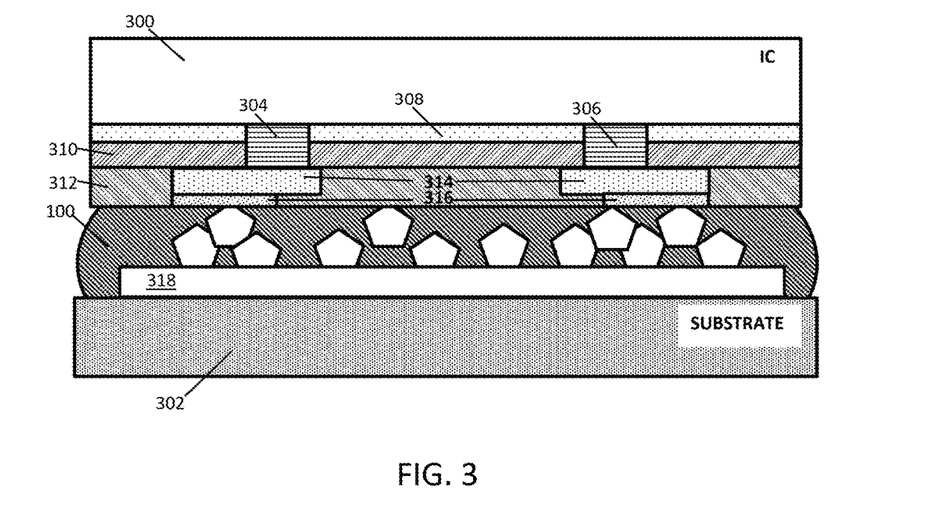
FIG. 3 shows an illustrative embodiment of a chip assembled on a substrate using conductive glue.

FIG. 3 shows an illustrative embodiment of a chip 300 assembled on a substrate 302 using conductive glue 100. The chip 300 has contact pads 304, 306 which are connected to the conductive glue 100 via under-bump metallizations (UBM) 314 and redistribution layer (RDL) metallizations 316. The UBMs 314 and RDL metallizations 316 are embedded in an insulation layer 312 that may be made from polyimide. Furthermore, the contact pads 304, 306 may be embedded in a passivation layer 308 and in another insulation layer 310 that may also be made from polyimide. The RDL metallizations 316 may be made from copper. Furthermore, a counter electrode 318 is connected to the substrate 302.

Figure 4:
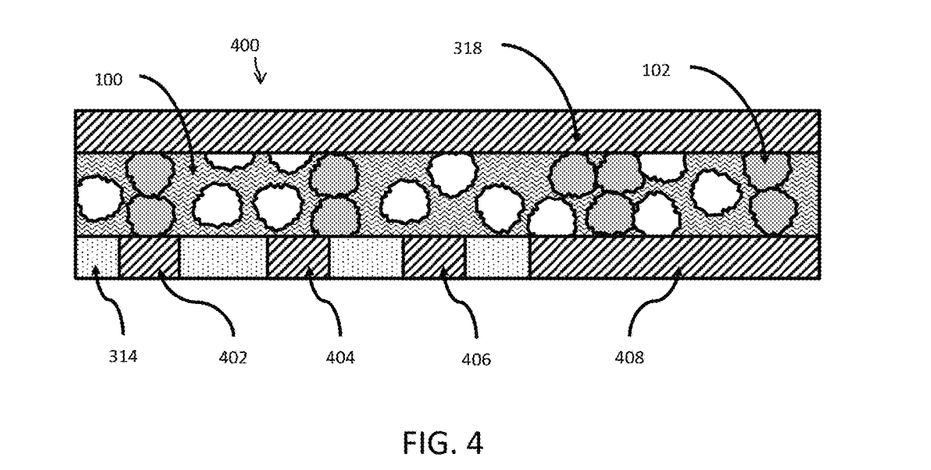
FIG. 4 shows an illustrative embodiment of an electronic device.

FIG. 4 shows an illustrative embodiment of an electronic device 400. The electronic device 400 comprises conductive glue 100 and a plurality of driving electrodes 402, 404, 406 which are connected to the conductive glue 100. Furthermore, the electronic device 400 comprises a receiving electrode 408 and a counter electrode 318, both of which are also connected to the conductive glue 100. The driving electrodes 402, 404, 406 and the receiving electrode 408 are connected to an integrated circuit (not shown). Furthermore, the counter electrode 318 is connected to a substrate (not shown). The glue 100 comprises conductive particles which electrically connect the receiving electrode 408, the counter electrode 318 and at least a part of the driving electrodes 402, 404.

In operation, if drive currents are provided to the driving electrodes 402, 404, 406, at least a part of the drive currents flows to the receiving electrode 408 through the conductive particles and the counter electrode 318. In the present example, drive currents will flow from driving electrodes 402 and 404, because they are electrically connected to the counter electrode 318 through conductive paths formed by adjoining conductive particles. However, no current will flow from driving electrode 406 because no such conductive path exists. The locations of such conductive paths in the glue 100 may vary among different IC-substrate assemblies. Therefore, the proportion of the drive currents that flows to the receiving electrode 408 will also vary among different assemblies, and may thus be used as a basis for identifying a particular assembly.

More specifically, at locations where the counter electrode 408 is not opposed by any of the driving electrodes 402, 404, 406 the particles are less likely to establish electrical contact. The dimensions of the driving electrodes 402, 404, 406 relative to the size of the particles 102 contained in the conductive glue 100 may be chosen such that electrical contact between the counter electrode 408 and any of the driving electrodes 402, 404, 406 is in average only established by half the amount of the number of driving electrodes 402, 404, 406. As a consequence, galvanic connection between the counter electrode 408 and any of the driving electrodes 402, 404, 406 may be dependent on the random distribution of conductive particles 102 in the conductive glue 100. The size of the receiving electrode 418 relative to the size of the particles 102 may be chosen such that electrical contact is always established with the counter electrode 318. The skilled person will appreciate that the electronic device 400 may comprise more than one counter electrode 318.

Figure 5:
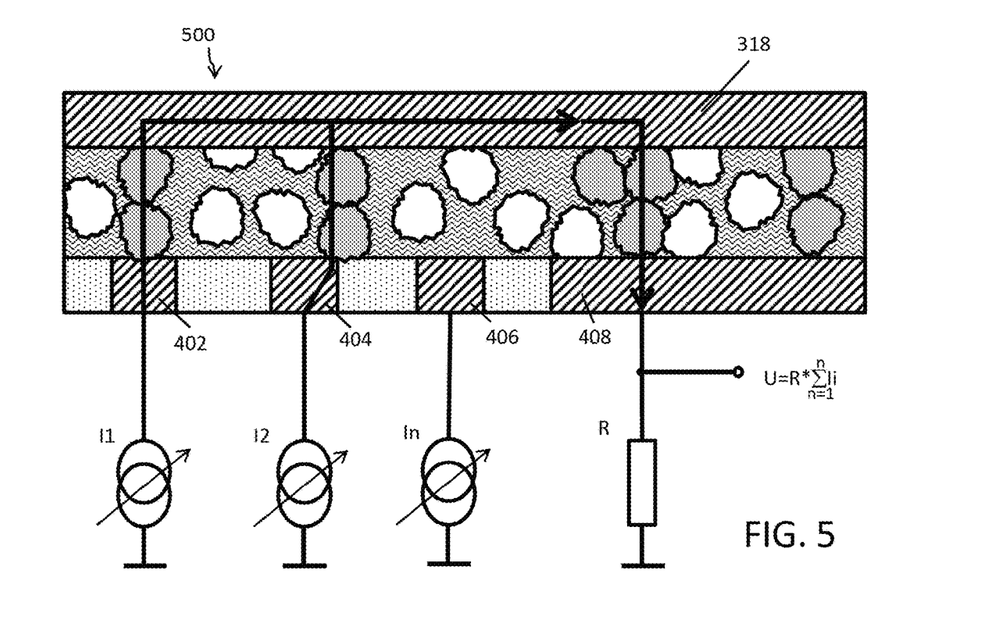
FIG. 5 shows an illustrative embodiment of a device implementation.

FIG. 5 shows an illustrative embodiment of a device implementation 500. In this example, a set of software-controlled currents I1, I2 . . . In is injected into the driving electrodes 402, 404, 406. If electrical contact is established between at least a part of the driving electrodes 402, 404, 406 and the receiving electrode 408 through conductive particles, a sum of currents is received by the receiving electrode 408. The sum of currents received by the receiving electrode 408 may be converted by a suitable means into a numerical representation that may be processed by a processing unit (not shown). In this example the sum of currents is fed to a resistor being connected to a reference potential. The voltage that develops across said resistor is a measure for the sum of currents and may be converted into a numerical value using an Analog-to-Digital converter (not shown).

Figure 6:
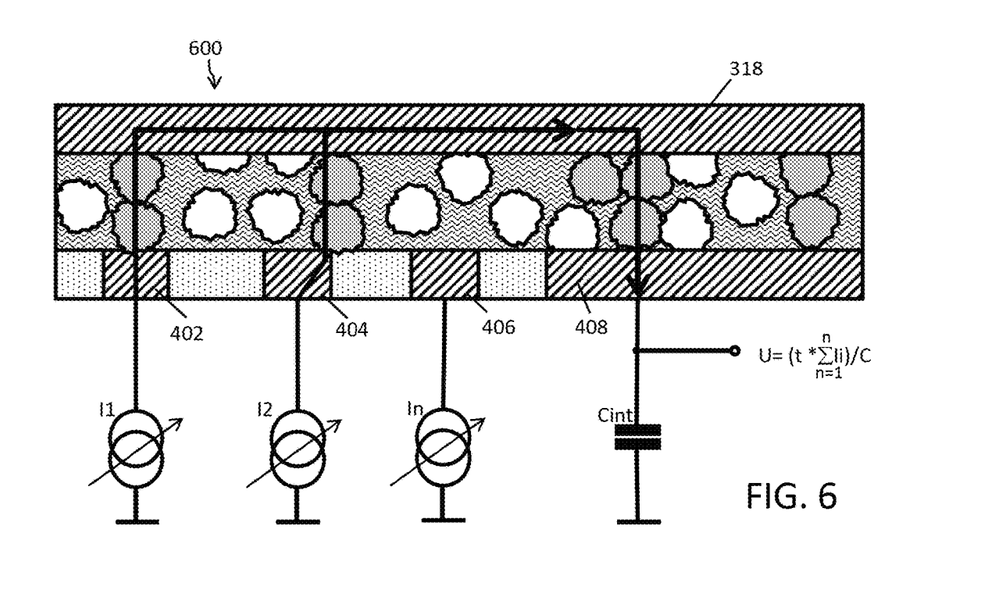
FIG. 6 shows an illustrative embodiment of another device implementation.

FIG. 6 shows an illustrative embodiment of another device implementation 600. In this example, an integrator is used to convert the sum of currents received by the receiving electrode 408 into a voltage, wherein the voltage also depends on the time t that the sum of currents is applied.

Figure 7:
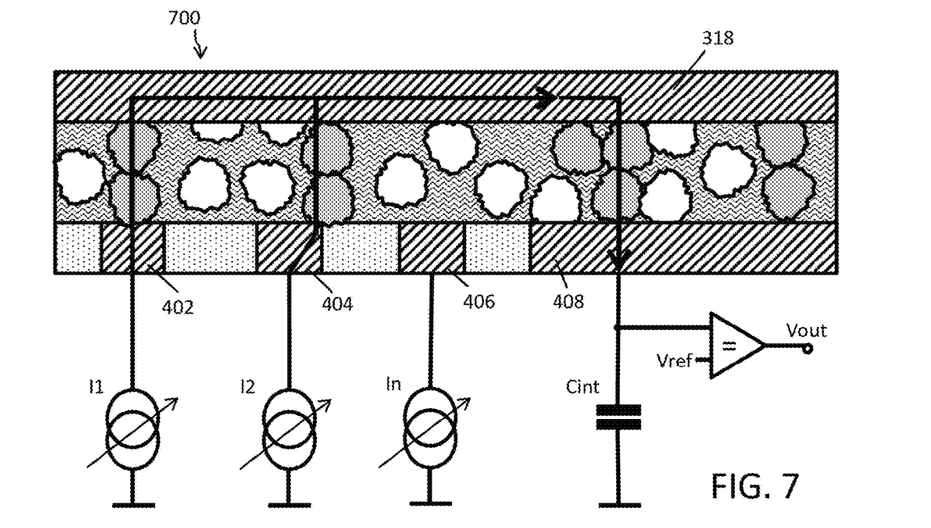
FIG. 7 shows an illustrative embodiment of a further device implementation.

FIG. 7 shows an illustrative embodiment of a further device implementation 700. In this example, a comparator is used to check whether the voltage across capacitor Cint exceeds the applied reference voltage Vref. The time between the first assertion of the sum of currents and the moment when the voltage across the capacitor Cint exceeds the reference voltage Vref is an indirect measure for the sum of currents. This approach is well suited for implementation on processing units that can easily be configured to measure time by counting clock cycles. The comparator and the reference voltage may in another embodiment (not shown) be replaced by an input-buffer exhibiting a fixed trip voltage, wherein an input voltage below the trip voltage results in an output signal of logic Low while an input voltage above the trip voltage results in an output signal of logic High. In one embodiment the currents I1, I2 . . . In are lower than 10 μA and are provided by the integrated circuit; thus the capacitor Cint may be made small enough to be also integrated into said integrated circuit. Applying this approach may provide a physical unclonable function from glue material used for chip assembly. The chip to be secured comprises sets of driving electrodes and corresponding comparators that are used to determine the random distribution of particles in the glue used to assemble the same chip. The electrodes may be arranged in a cross-hatch arrangement. Existing process modules may be used for forming the so-called redistribution layers for creation and arrangements of hatch-patterns on top of the active side of a chip.

Figure 8:
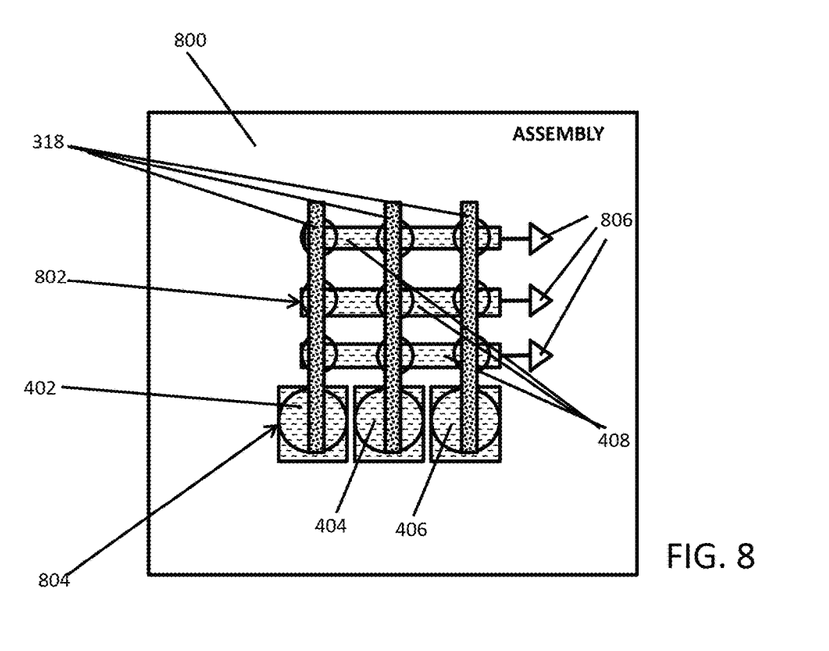
FIG. 8 shows an illustrative embodiment of an IC-substrate assembly.

FIG. 8 shows an illustrative embodiment of an IC-substrate assembly 800. The assembly 800 contains an arrangement including driving electrodes 402, 404, 406, counter electrodes 318, receiving electrodes 408 and receiving comparators 806. The electrodes may be arranged in rows and columns on the active surface of an integrated circuit or chip. Electrical contact 804 may be established between a driving electrode 402 and a counter electrode 318. A window 802 in the polyimide insulation layer may enable electrical contact between the counter electrode 318 and a receiving electrode 408. In this example, nine galvanic sensors (i.e., contact points between a counter electrode and a receiving electrode) organized in three rows and three columns are provided. Drive currents are supplied to the driving electrodes by means of sure contacts. The arrangements in rows and columns may be freely chosen as available space allows.

Figure 9:
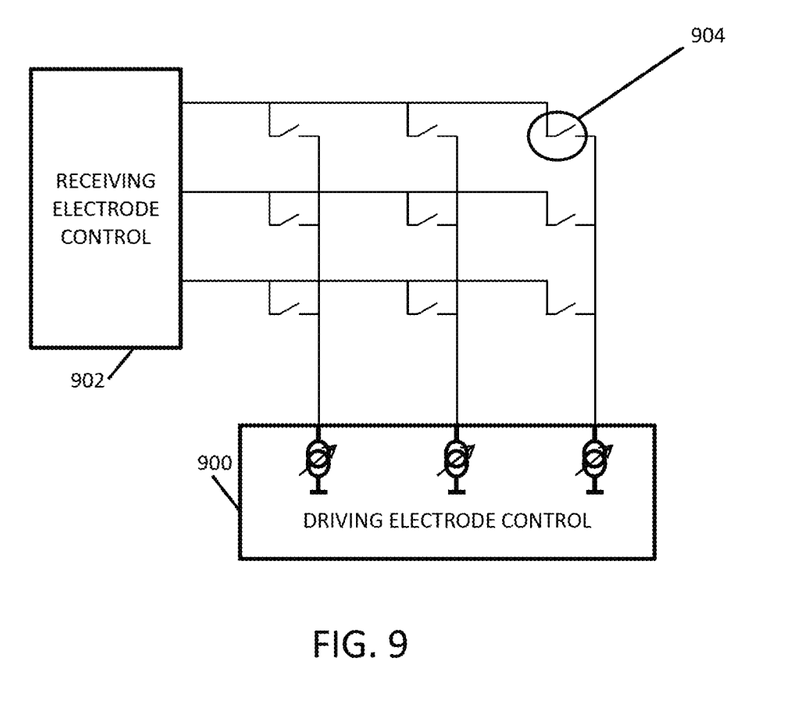
FIG. 9 shows an illustrative embodiment of a control system.

FIG. 9 shows an illustrative embodiment of a control system. A plurality of galvanic sensors 904 may be provided in an IC-substrate assembly. Driving electrodes may be controlled by driving electrode control circuit 900. Controlling the driving electrodes involves supplying drive currents to the driving electrodes. Receiving electrodes may be controlled by a receiving electrode control circuit 902. Controlling the receiving electrodes involves processing a proportion of received drive currents. The drive currents may be weighted by assigning different multiples of a current unit to individual drive electrodes. Thus, in one or more embodiments, the drive currents are weighted drive currents corresponding to a challenge code. By means of such a challenge code the IC-substrate assembly may be identified more precisely. It is noted that at least a part of said weights may also be set to zero. The challenge code may be generated by a processing unit comprised in the integrated circuit, which raises the bar for an attacker to obtain said code.

The inputs of the receiving electrode control circuit 902 may be arranged to sense the applied sum of currents in an appropriate way. In case a sensing circuit as shown in FIG. 7 is used an integration time may be measured which is associated to an individual receiving comparator channel that is indicative of the reference voltage level and also of the sum of currents applied to that comparator channel. Thus a time represented by a cycle count is measured that is indicative of the distribution of glue particles and also of the challenge code being applied. By sequentially performing said sum-of-current measurements, each being based on a different challenge code, a corresponding set of responses may be captured. In that case, the resulting sum-of-current readings over challenges represent a response pattern. This response pattern is thus based on a sequence of current output values of the kind set forth. In one or more embodiments, the processing unit is further arranged to compare the response pattern with a predetermined response code. Accordingly, the IC-substrate assembly may be identified with higher precision. The entropy of the responses may be increased by adjusting different factors, for example the amount of galvanic sensors, the arrangement of the galvanic sensors in rows and columns, the entropy of challenge codes, the amount of challenge codes applied, the size of conductive particles relative to the size of electrodes.

Figure 10:
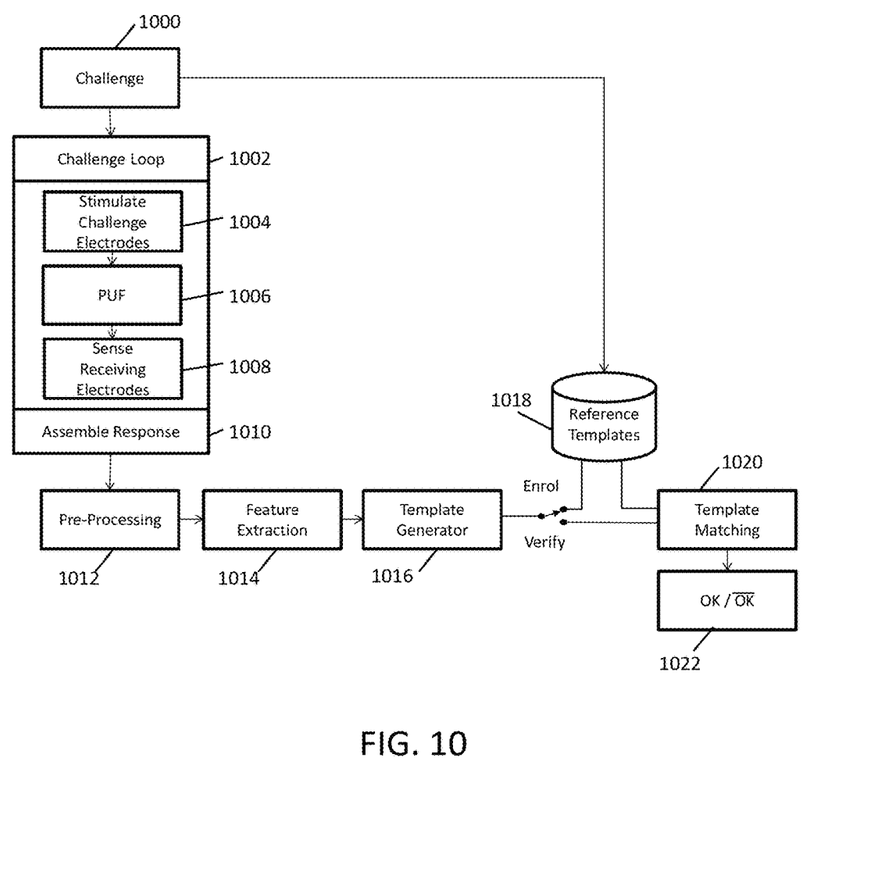
FIG. 10 shows an illustrative embodiment of a biometric system.

FIG. 10 shows an illustrative embodiment of a biometric system. This system may be referred to as a biometric system, because the derived identifier or signature of the IC-substrate assembly may be regarded as a physical fingerprint of said assembly. In a challenge loop 1002 at least one challenge 1000 is applied and the resulting response is obtained by means of one or more sum-of-current measurement readings of the kind set forth. In each iteration of the loop, a set of driving electrodes (or challenge electrodes) may be stimulated 1004, and the sum of currents influenced by the conductive particles (implementing a PUF 1006) may be measured or sensed by receiving electrodes at 1008. The response obtained may exhibit a variation based on, for example, environmental effects. To make the response applicable for further evaluation it may have to undergo a feature extraction process 1014 that extracts a reliable set of identification features which are independent of said environmental impacts. The extracted feature may be a sum-of-currents reading that by pre-processing 1012 has been corrected for environmental impacts comprising, for instance, temperature, humidity and air pressure. Thereby, a more reliable identification of the IC-substrate assembly may be achieved. The extracted identification feature may be a set of capacitance measurements based on a series of challenge codes. Said extracted feature may be formatted by a template generator 1016 as a template for easy and fast matching against a reference template in a template database 1018. In a device manufacturing phase, a set of challenge-response pairs may be determined and stored as a set of reference templates in the database 1018 within a secure storage unit of the chip, for example. This process is called enrolment. The stored challenge-response pairs may form a code alphabet. In a normal operating mode, challenges from the code alphabet are applied and the resulting responses are matched 1020 against the reference templates. A threshold may be defined to set the number of positive verifications that should be obtained from a set of challenge/response pairs to achieve an overall positive verification result 1022. It may be useful to update the physical fingerprint by defining a new set of challenge/response pairs. By principle the system as disclosed here is able to provide a large but not unlimited number of challenge/response pairs that may be regarded as the definition space for the code alphabet used by the biometric system.

Figure 11:
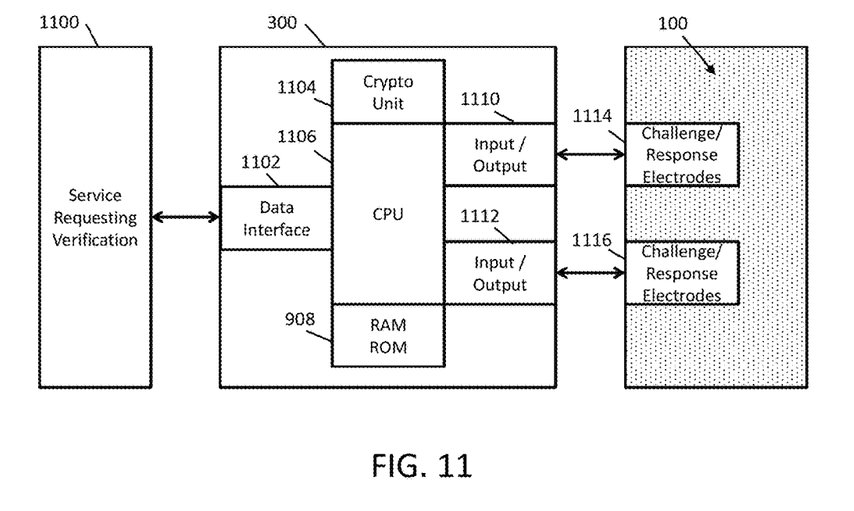
FIG. 11 shows an illustrative embodiment of a chip with an embedded biometric system.

FIG. 11 shows an illustrative embodiment of a chip with an embedded biometric system. The biometric system used to verify the IC-substrate assembly may be integrated into the IC 300 (chip) which forms part of said assembly, as shown in FIG. 11. The IC 300 may be a security controller chip, which comprises a data interface 1102 for connecting the IC 300 to a service 1100 that requests verification of the assembly, a cryptographic unit 1104, a central processing unit 1106, a memory unit 1108 (for example RAM and/or ROM), and input/output interfaces 1110, 1112 for connecting the IC 300 to challenge/response electrodes 1114, 1116 connected to the conductive glue 100. The input/output interfaces 1110, 1112 may be controlled by the central processing unit 1106 of the IC 300. As mentioned above, the processing unit, which is arranged to receive the current output values (i.e., the values corresponding to the measured sums of currents) and compare them with reference values, may be comprised in the IC 300. This is useful because it may increase the level of security, in the sense that the risk that the processing unit is tampered with may be reduced, in particular in case the IC 300 is a security controller chip. Said processing unit may be the central processing unit 1106 shown in FIG. 11, for example.

Figure 12:
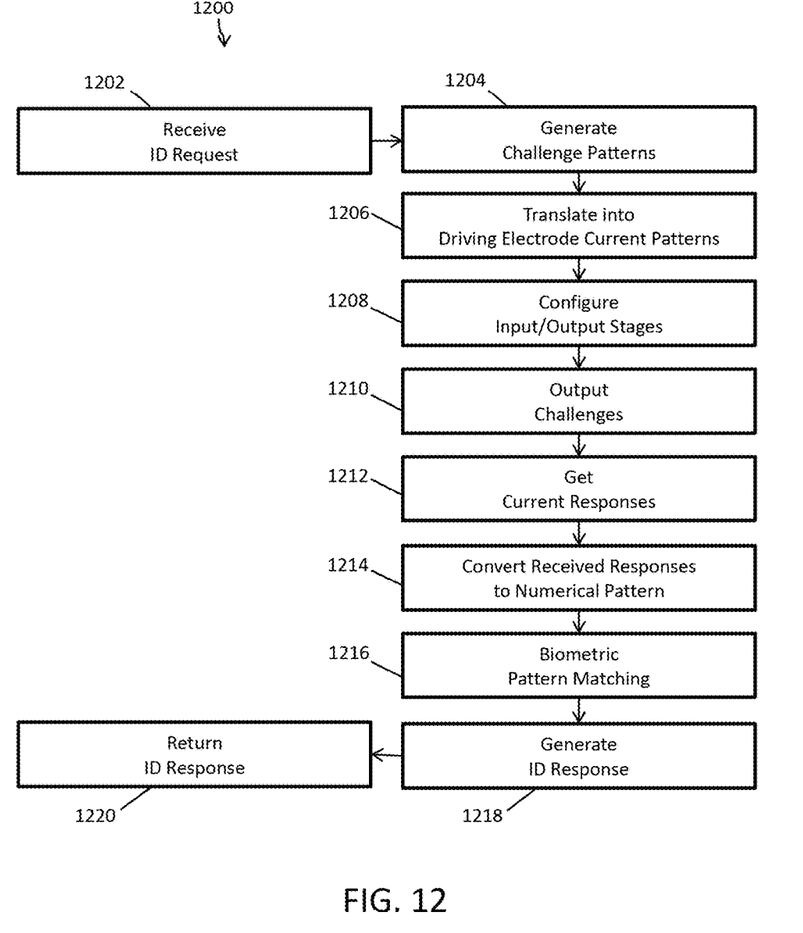
FIG. 12 shows an example of a verification sequence.

FIG. 12 shows an example of a verification sequence 1200. The verification sequence comprises, at 1202, receiving an identification request, i.e. receiving a request to verify the identity of an IC-substrate assembly in accordance with the present disclosure. Furthermore, the verification sequence 1200 comprises, at 1204, at 1204, generating challenge patterns, at 1206, translating the challenge patterns into driving electrode current patterns, at 1208, configuring input/output stages, at 1210, outputting challenges, at 1212, getting current responses, at 1214, converting the received responses to a numerical pattern, at 1216, performing biometric pattern matching, at 1218, generating an identification response, at 1220, returning the identification response.

For the purpose of secure assembly authentication it may be desirable to produce reliable verifications with low False Acceptance Rates (FAR) and high False Reject Rates (FRR). The FAR may be easily controlled by adjusting the amount of challenges to be used to generate one response. The FRR may be scaled by proper definition of the different factors impacting the overall code entropy. Furthermore, when combined with a chip-related physical unclonable function, such as an SRAM-PUF, the resulting combination exhibits larger entropy than the SRAM-PUF applied alone.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 conductive glue
102 conductive particles
200 contact pad
202 contact pad
300 integrated circuit
302 substrate
304 contact pad
306 contact pad
308 passivation layer
310 polyimide insulation layer
312 polyimide insulation layer
314 under-bump metallization
316 RDL metallization
318 counter electrode
400 electronic device
402 driving electrode
404 driving electrode
406 driving electrode
408 receiving electrode
500 device implementation
600 device implementation
700 device implementation
800 IC-substrate assembly
802 window in polyimide insulation layer
804 electrical contact
806 receiving comparators
900 driving electrode control
902 receiving electrode control
904 galvanic sensor
1000 challenge code
1002 challenge loop
1004 stimulate challenge electrodes
1006 physical unclonable function
1008 sense receiving electrodes
1010 assemble response code
1012 pre processing
1014 feature extraction
1016 template generator
1018 reference templates
1020 template matching
1022 verification result
1100 service requesting verification
1102 data interface
1104 cryptographic unit
1106 central processing unit
1108 memory unit
1110 input/output interface
1112 input/output interface
1114 challenge/response electrodes
1116 challenge/response electrodes
1200 verification sequence
1202 receive identification request
1204 generate challenge patterns
1206 translation into driving electrode current patterns
1208 configure input/output stages
1210 output challenges
1212 get current responses
1214 convert received responses to numerical pattern
1216 biometric pattern matching
1218 generate identification response
1220 return identification response

The invention claimed is:

1. An electronic device comprising:
a substrate;
an integrated circuit;
a layer of glue between the substrate and the integrated circuit;
a set of driving electrodes coupled to the glue and to the integrated circuit;
a receiving electrode coupled to the glue and to the integrated circuit;
a counter electrode coupled to the glue and to the substrate;
wherein the glue comprises conductive particles which electrically connect the receiving electrode, the counter electrode and at least a part of the set of driving electrodes, such that, if drive currents are provided to said set of driving electrodes, at least a part of the drive currents flows to the receiving electrode through the conductive particles and the counter electrode.

2. The device of claim 1, wherein said part of the drive currents that flows to the receiving electrode depends on the distribution of the conductive particles in the glue.

3. The device of claim 2, wherein the distribution of conductive particles implements a physical unclonable function.

4. The device of claim 1, further comprising:
a current generator arranged to generate said drive currents;
a measurement unit arranged to measure the part of the drive currents received by the receiving electrode and to output a corresponding current output value;
a processing unit arranged to receive at least one current output value from the measurement unit, and to compare said current output value with a reference value.

5. The device of claim 4, wherein the processing unit is further arranged to correct the current output value for environmental influences.

6. The device of claim 4, wherein the integrated circuit comprises at least one of: the processing unit, the set of driving electrodes, the receiving electrode, the current generator, the measurement unit.

7. The device of claim 1, wherein the drive currents are weighted drive currents corresponding to a challenge code.

8. The device of claim 7, wherein the challenge code is generated by a processing unit comprised in said device.

9. The device of claim 8, wherein the processing unit is further arranged to compare a sequence of current output values with a predetermined response code.

10. The device of claim 1, wherein the integrated circuit is a general-purpose processor chip or an application processor chip.

11. The device of claim 1, wherein the substrate is a printed circuit board or a card inlay.

12. The device of claim 1, wherein the integrated circuit is a secure element, in particular a secure controller chip.

13. The device of claim 1, being a smart card.

14. A method of manufacturing an electronic device, the method comprising providing the electronic device with:
- a substrate;
- an integrated circuit;
- a layer of glue between the substrate and the integrated circuit;
- a set of driving electrodes coupled to the glue and to the integrated circuit;
- a receiving electrode coupled to the glue and to the integrated circuit;
- a counter electrode coupled to the glue and to the substrate;
- wherein the glue comprises conductive particles which electrically connect the receiving electrode, the counter electrode and at least a part of the set of driving electrodes, such that, if drive currents are provided to said set of driving electrodes, at least a part of the drive currents flows to the receiving electrode through the conductive particles and the counter electrode.

* * * * *